United States Patent
Moll (10) Patent No.: US 11,084,070 B2
(45) Date of Patent: Aug. 10, 2021

(54) DEVICE FOR CLEANING STEAM WAND OF A BEVERAGE BREWING APPARATUS

(71) Applicant: Joel Moll, Snoqualmie, WA (US)

(72) Inventor: Joel Moll, Snoqualmie, WA (US)

( * ) Notice: Subject to any disclaimer, the term of this patent is extended or adjusted under 35 U.S.C. 154(b) by 129 days.

(21) Appl. No.: 16/456,908

(22) Filed: Jun. 28, 2019

(65) Prior Publication Data

US 2020/0406317 A1    Dec. 31, 2020

(51) Int. Cl.
| | |
|---|---|
| *B08B 9/02* | (2006.01) |
| *B08B 1/00* | (2006.01) |
| *B08B 3/08* | (2006.01) |
| *A47J 31/60* | (2006.01) |
| *A47J 31/44* | (2006.01) |
| *C11D 3/386* | (2006.01) |

(52) U.S. Cl.
CPC ........... *B08B 9/021* (2013.01); *A47J 31/4489* (2013.01); *A47J 31/60* (2013.01); *B08B 1/005* (2013.01); *B08B 3/08* (2013.01); *C11D 3/386* (2013.01); *B08B 2209/02* (2013.01)

(58) Field of Classification Search
CPC . A61B 90/70; B08B 9/22; B08B 9/021; A47J 31/60
See application file for complete search history.

(56) References Cited

U.S. PATENT DOCUMENTS

| | | | | |
|---|---|---|---|---|
| 2015/0335143 | A1* | 11/2015 | Edmond | A46B 13/02 15/88 |
| 2016/0045629 | A1* | 2/2016 | Gardner | A61B 90/70 422/292 |

\* cited by examiner

*Primary Examiner* — Shay Karls
(74) *Attorney, Agent, or Firm* — Walker Griffin Weitzel; Alloy Patent Law (57) ABSTRACT

Disclosed is a device and method for cleaning a steam wand of a beverage brewing apparatus. The device includes a first reservoir, a larger elastically deformable reservoir, a scrubbing means, a first one-way valve, and a second one-way valve. The first reservoir is adapted to closely encapsulate the steam wand. The first reservoir is open at one end to receive the steam wand. The larger elastically deformable reservoir is adapted to contain a larger sterile portion of a cleaning solution. The scrubbing means adapted to mechanically loosen milk residue through a scrubbing action. The first one-way valve is operable to connect the larger elastically deformable reservoir to the first reservoir. The second one-way valve is operable to allow air to flow into the larger elastically deformable reservoir.

11 Claims, 7 Drawing Sheets

DEVICE FOR CLEANING STEAM WAND OF A BEVERAGE BREWING APPARATUS

TECHNICAL FIELD

The present invention relates to a cleaning device, in particular to a device and method for cleaning a steam wand of a beverage brewing apparatus.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of themselves may also be inventions.

Typically, steam wands are used to heat and froth milk for hot drinks. In operation, the steam wands accumulate milk residue that must be cleaned from the steam wands by a user. Milk residue accumulates on both the exterior surfaces of the steam wand, as well as the interior surfaces of the steam wands during use. Currently, two methods of cleaning the steam wands are used. In the first method, the user soaks a towel or rag in either water or cleaning solution and wipes the exterior surfaces of the steam wand. In the second method, the user fills a small pitcher with water or cleaning solution and submerges the steam wand in the water to allow the steam wand to soak for a period of time. This method is most-often used overnight and is set up as the barista is closing down the shop.

This specification recognizes that steam wands need to be cleaned effectively and efficiently, and it is a challenge to maintain a clean, damp rag for use with an espresso machine. In commercial settings, such as a coffee bar, the rags are typically kept in a bucket or reservoir of water/bleach solution. The rags are continually being soiled through use, and it is common for the solution to become dirty. In home-use settings, the infrequency of use generally makes it impractical to maintain a rag that is continually damp. Therefore, a typical home user will have a rag that is wetted under a faucet each time the user needs to clean the steam wand. After use, the rag is then left to dry and is either laundered or reused at a later date. Note that dry rags are wholly ineffectual for cleaning milk residue from a steam wand after use—a damp rag is required. In both commercial and home-use situations, the current steam wand cleaning methods are time-consuming, wasteful, questionably sanitary, and/or ineffectual.

Thus, in view of the above, there is a long-felt need in the industry to address the aforementioned deficiencies and inadequacies.

SUMMARY

The present invention mainly cures and solves the technical problems existing in the prior art. In response to these problems, the present invention provides a device and method for cleaning a steam wand of a beverage brewing apparatus.

The present invention provides a device for cleaning a steam wand of a beverage brewing apparatus. The device includes a first reservoir, a second elastically deformable reservoir, a scrubbing means, a first one-way valve, and a second one-way valve. The first reservoir is adaptable to closely encapsulate the steam wand. The first reservoir being open at one end to receive the steam wand. The second elastically deformable reservoir is adapted to contain a larger sterile portion of a cleaning solution. The cleaning solution is an enzymatic milk cleanser. The scrubbing means is adapted to mechanically loosen milk residue through a scrubbing action. The first one-way valve is operable to allow fluid to flow from the second elastically deformable reservoir to the first reservoir. The second one-way valve is operable to allow air to flow into the second elastically deformable reservoir from the surrounding atmosphere.

In an aspect, the first reservoir and the second elastically deformable reservoir are made of transparent silicone material to facilitate a user to visually assess a fill level of the small cylindrical reservoir.

In an aspect, the first one-way valve and the second one-way valve are duck-billed valves.

In an aspect, the scrubbing means comprises a plurality of scrubbing features to mechanically loosen milk residue through a scrubbing action.

In an aspect, the device may include a filter unit to segregate the first reservoir from the first one-way valve to prevent residue particles from contaminating and defeating the first one-way valve.

An aspect of the present disclosure relates to a method for cleaning a steam wand of a beverage brewing apparatus. The method includes the step of filling a second elastically deformable reservoir with a predefined amount of a cleaning solution. The method then includes the step of squeezing the second elastically deformable reservoir to create a pressure differential to urge the cleaning solution into a first reservoir. Further, the method includes the step of inserting the steam wand into an opening at one end of the first reservoir. The method then includes the step of scrubbing the steam wand using a scrubbing means. The method includes the step of removing the steam wand from the first reservoir. Further, the method includes the step of discarding a soiled portion of the cleaning solution remains in the first reservoir.

Accordingly, one advantage of the present invention is that it supplies a fresh portion of the cleaning solution specially adapted for the task of removing milk residue.

Accordingly, one advantage of the present invention is that it applies the cleaning solution to the steam wand in a manner that efficiently and effectively cleans the wand.

Accordingly, one advantage of the present invention is that it is a portable device.

Accordingly, one advantage of the present invention is that it makes efficient use of cleaning solution.

Other features of embodiments of the present invention will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. Ther invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

The present invention is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Device and method are disclosed for cleaning a steam wand of a beverage brewing apparatus. Embodiments of the present invention include various steps, which will be described below. Although the present invention has been described with the purpose of steam wand cleaning, it should be appreciated that the same has been done merely to illustrate the invention in an exemplary manner and to highlight any other purpose or function for which explained structures or configurations could be used and is covered within the scope of the present invention.

Figure 1:
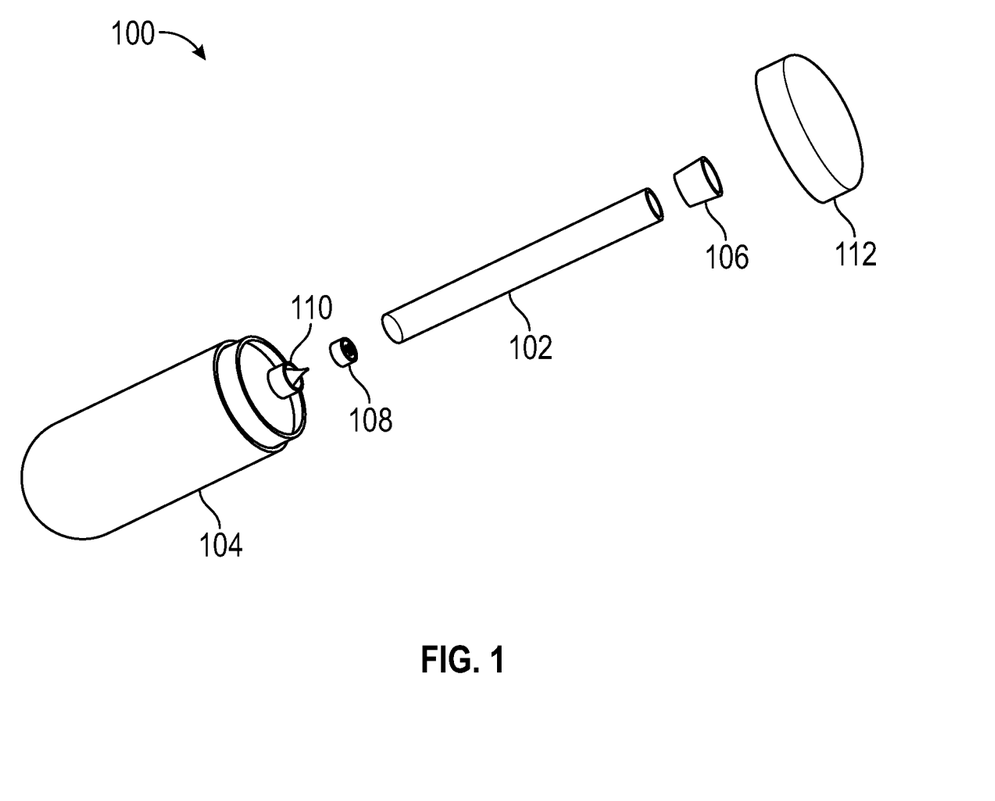
FIG. 1 illustrates an exploded view of a device for cleaning a steam wand of a beverage brewing apparatus, in accordance with one embodiment of the present invention.

FIG. 1 illustrates an exploded view of a device 100 for cleaning a steam wand of a beverage brewing apparatus, in accordance with one embodiment of the present invention. The device 100 includes a first reservoir 102, a second elastically deformable reservoir 104, a scrubbing means 106, a particulate filter 108, a first one-way valve 110, and a second one-way valve 202 (shown in FIG. 2). An example of the beverage brewing apparatus is an espresso machine.

The first reservoir 102 is adaptable to closely encapsulate the steam wand. The first reservoir 102 being open at one end to receive the steam wand. The second elastically deformable reservoir 104 is adapted to contain a larger sterile portion of a cleaning solution. The cleaning solution is a food-grade cleanser that is safe for human consumption in residual amounts. In an embodiment, the cleaning solution is an enzymatic milk cleanser. In an embodiment, the enzymatic milk cleanser is acidic, organic milk frother cleaner such as Cafetto MFC® that is safe for human consumption in residual amounts after cleaning.

The scrubbing means 106 (explained in FIGS. 3-6) is a scrubbing unit that mechanically loosens milk residue through a scrubbing action. In an embodiment, the scrubbing means includes a plurality of scrubbing features such as bristles to mechanically loosen milk residue through a scrubbing action.

Figure 2:
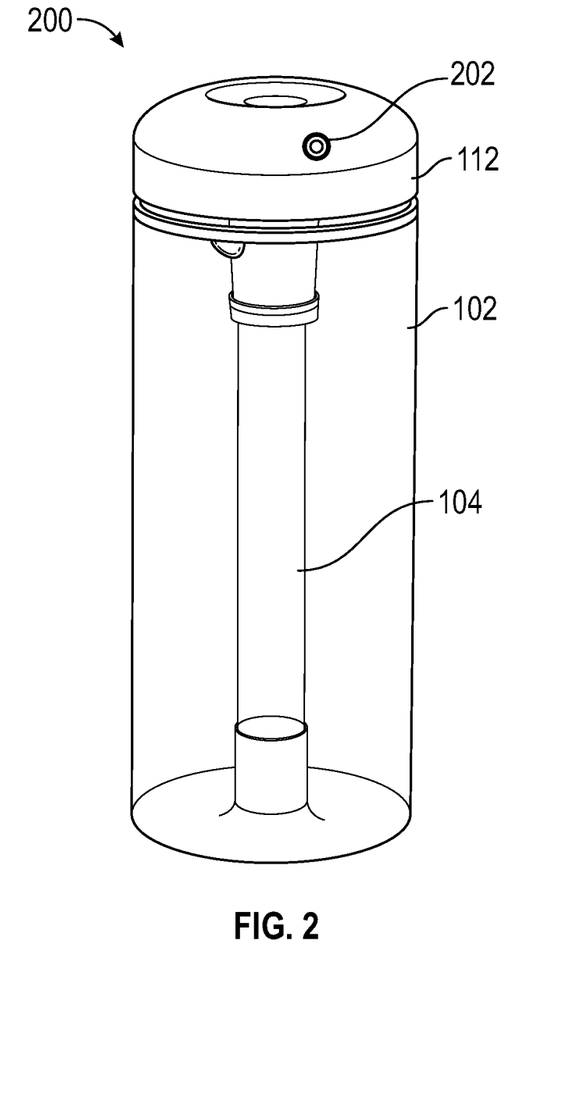
FIG. 2 illustrates a perspective view of the device for cleaning a steam wand of a beverage brewing apparatus, in accordance with one embodiment of the present invention.

The first one-way valve 110 is operable to connect the second elastically deformable reservoir 104 to the first reservoir 102. The second one-way valve 202 is operable to allow air to flow into the second elastically deformable reservoir 104. In an embodiment, the first one-way valve 110 and the second one-way valve 202 are duck-billed valves.

In an embodiment, the device 100 may include a filter unit 108 to segregate the first reservoir 102 from the first one-way valve 110 to prevent residue particles from contaminating and defeating the first one-way valve 110. The device 100 further includes a plastic cap 112 to cover the device from the top and firmly bind to the neck of the device, as well as creating a substantially closed volume capable of effectively containing fluids. In an embodiment, the plastic cap 112 comprises a silicone overmold and an integrated valve.

In an embodiment, the first reservoir 102, second elastically deformable reservoir 104, scrubbing means 106, first one-way valve 110, second one-way valve 202, filter unit, and plastic cap 112 are made of silicone material because the steam wands typically provide high-temperature steam. Thus the device 100 needs to be able to withstand high temperatures. Therefore the preferred material for each component of the present device 100 is silicone that mitigates the possibility of damage resulting from heat exposure.

FIG. 2 illustrates a perspective view 200 of the device for cleaning a steam wand of a beverage brewing apparatus, in accordance with one embodiment of the present invention. In an embodiment, the first reservoir 102 and the second elastically deformable reservoir 104 are made of transparent silicone material to facilitate a user to visually assess a fill level of the small cylindrical reservoir 102. Further, the present device 200 may have a tapered cylinder form that increases stability and allows for different hand sizes.

In operation, the user has to fill the small reservoir with an appropriate amount of cleaning solution, and the device 100 does not include a mechanism for portioning, therefore, the preferred embodiment requires both the second elastically deformable reservoir 104 and first reservoir 102 to be transparent in order to allow the user to visually assess the fill level of the first reservoir 102.

Figure 3:
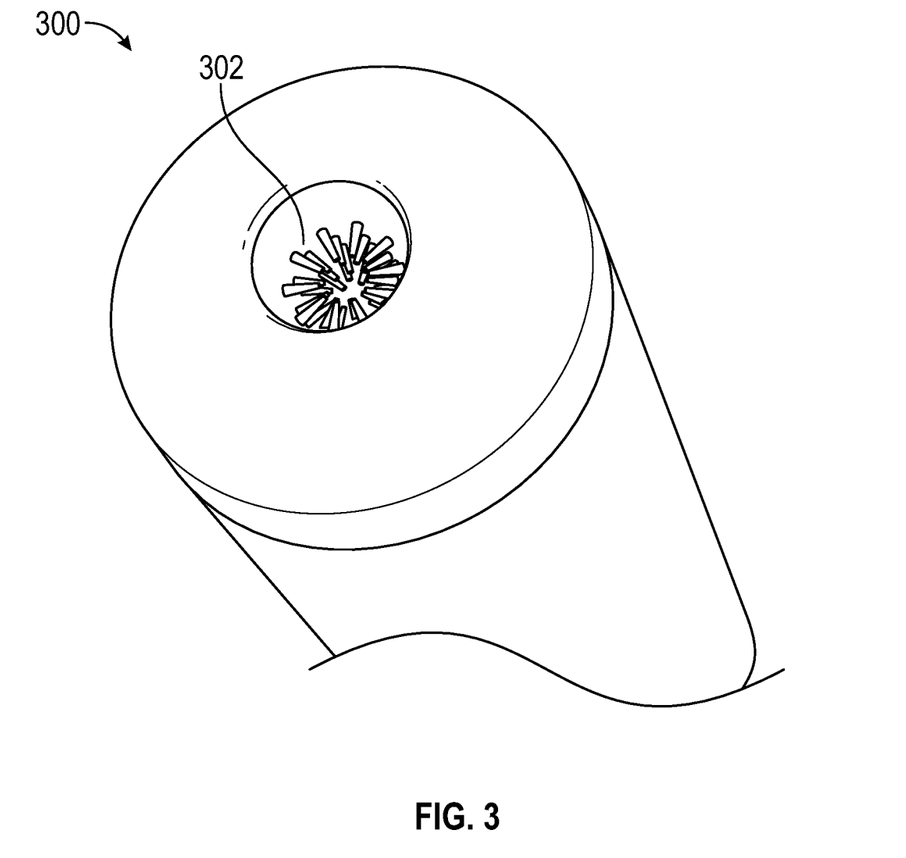
FIG. 3 illustrates a perspective view a first scrubbing means, in accordance with one embodiment of the present invention.
Figure 4:
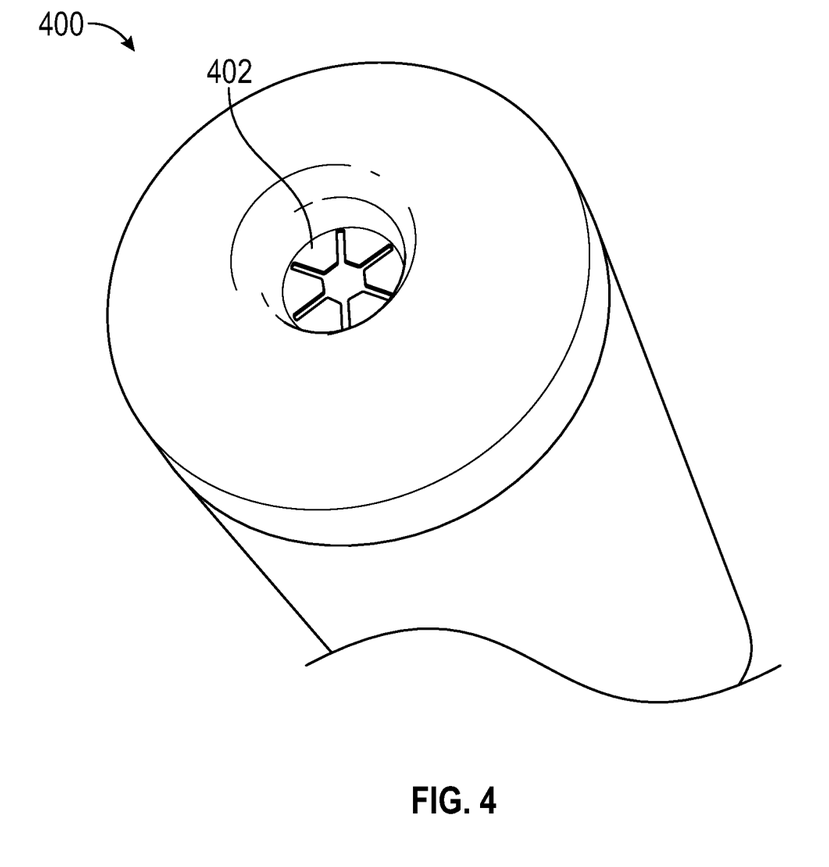
FIG. 4 illustrates a perspective view of a second scrubbing means, in accordance with one embodiment of the present invention.
Figure 5:
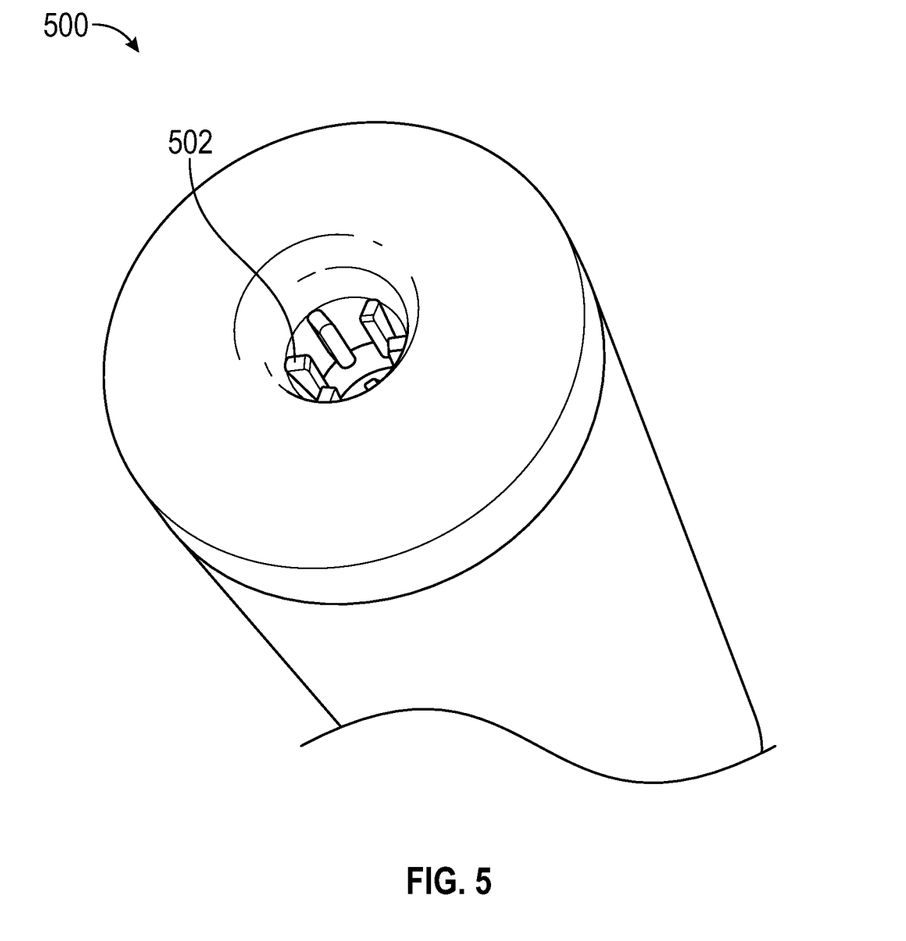
FIG. 5 illustrates a perspective view of a third scrubbing means, in accordance with one embodiment of the present invention.
Figure 6:
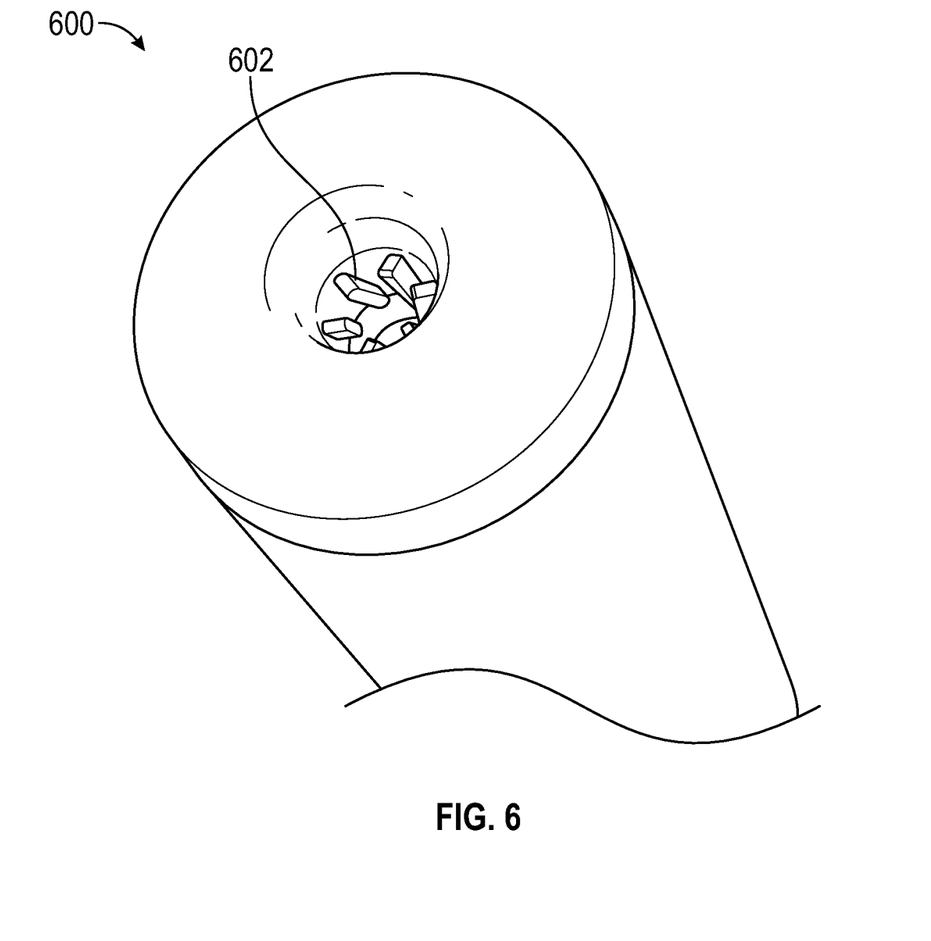
FIG. 6 illustrates a perspective view of a fourth scrubbing means, in accordance with one embodiment of the present invention.

The scrubbing means provide various scrubbing options to mechanically loosen milk residue through a scrubbing action. FIG. 3 illustrates a perspective view 300 a first scrubbing means, in accordance with one embodiment of the present invention. FIG. 4 illustrates a perspective view 400 of a second scrubbing means, in accordance with one embodiment of the present invention. FIG. 5 illustrates a perspective view 500 of a third scrubbing means, in accordance with one embodiment of the present invention. FIG. 6 illustrates a perspective view 600 of a fourth scrubbing means, in accordance with one embodiment of the present invention. The scrubbing options include but not limited to nubby bristles 302, wiper blades 402, vertical scrubbers 502, and angled scrubbers 602. In an embodiment, the scrubber means may include various possible combination depending on moldability.

Figure 7:
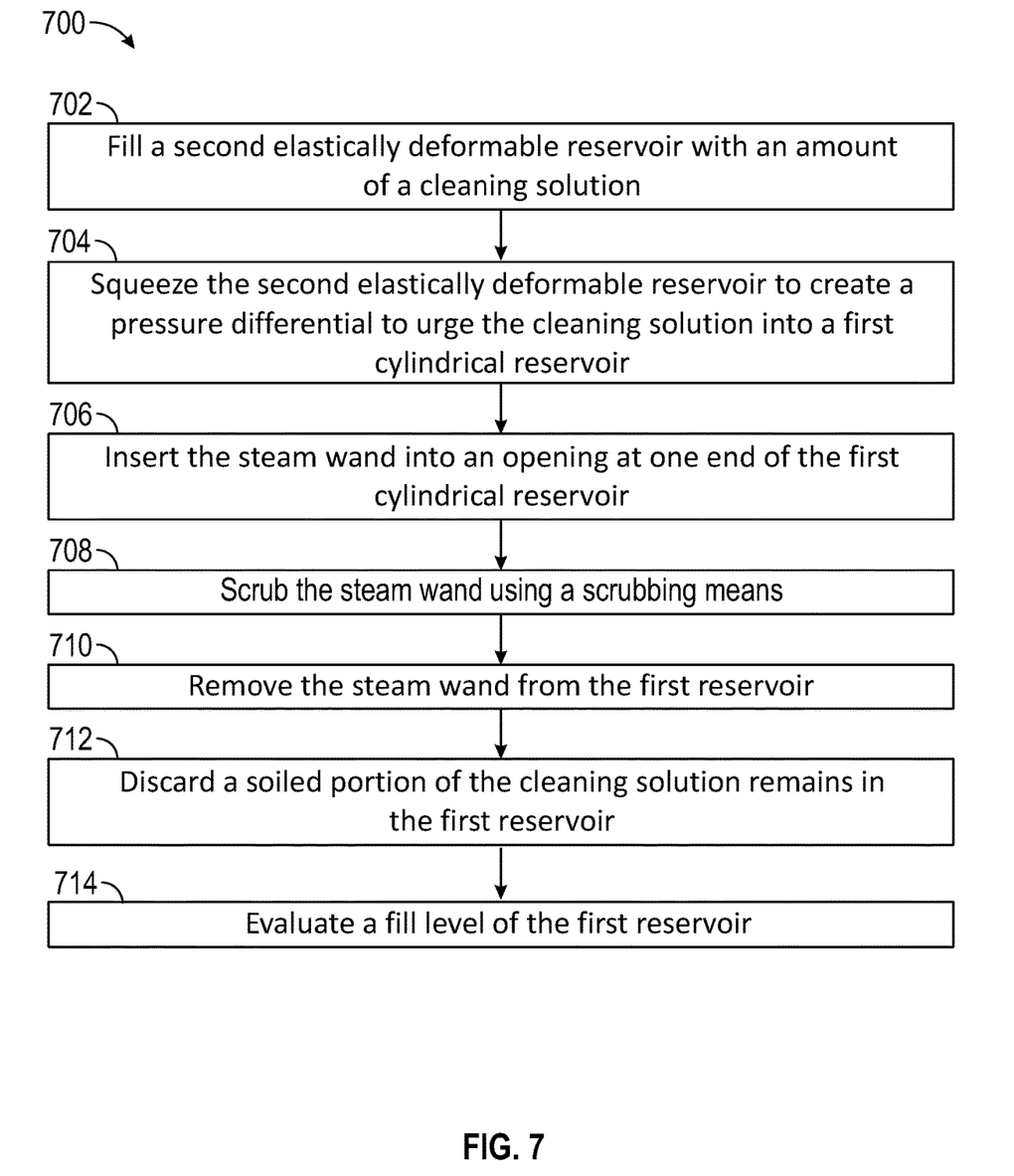
FIG. 7 illustrates a flowchart of a method for cleaning a steam wand of a beverage brewing apparatus, in accordance with one embodiment of the present invention.

FIG. 7 illustrates a flowchart 700 of a method for cleaning a steam wand of a beverage brewing apparatus, in accordance with one embodiment of the present invention. The method includes the step 702 of filling a second elastically deformable reservoir with a predefined amount of a cleaning solution. The method then includes the step 704 of squeezing the second elastically deformable reservoir to create a pressure differential to urge the cleaning solution into a first reservoir. Further, the method includes the step 706 of inserting the steam wand into an opening at one end of the first reservoir. The method then includes the step 708 of scrubbing the steam wand using a scrubbing means. The method includes the step 710 of removing the steam wand from the first reservoir. Further, the method includes the step 712 of discarding a soiled portion of the cleaning solution remains in the first reservoir. The method includes the step 714 of evaluating a fill level of the first reservoir. The first reservoir and the second elastically deformable reservoir are made of transparent silicone material The present device and method may be utilized in medical settings, such as cleaning of arthroscopes, certain dental equipment, or other similar elongate devices. Thus the device and method supply a fresh portion of cleaning solution specially adapted for the task of removing milk residue may be more broadly applied to removal of organic residue from elongate members, devices, or protuberances. Further, the present device and method apply the cleaning solution to the steam wand in a manner that efficiently and effectively cleans the wand.

While embodiments of the present invention have been illustrated and described, it will be clear that the invention is not limited to these embodiments only. Numerous modifications, changes, variations, substitutions, and equivalents will be apparent to those skilled in the art, without departing from the scope of the invention, as described in the claims.

The invention claimed is:

1. A device for cleaning a steam wand of a beverage brewing apparatus, the device comprising:
    a first reservoir adapted to closely encapsulate a steam wand, wherein the first reservoir is open at one end and adapted to receive the steam wand;
    a second elastically deformable reservoir adapted to contain a larger sterile portion of a cleaning solution;
    a scrubbing means adapted to mechanically loosen milk residue through a scrubbing action;
    a first one-way valve operable to connect the second elastically deformable reservoir to the first reservoir; and
    a second one-way valve operable to allow air to flow into the second elastically deformable reservoir.

2. The device according to claim 1, wherein the first reservoir and the second elastically deformable reservoir are made of transparent silicone material to facilitate a user to visually assess a fill level of the small cylindrical reservoir.

3. The device according to claim 1, wherein the first one-way valve and the second one-way valve are duckbilled valves.

4. The device according to claim 1, wherein the scrubbing means comprises a plurality of scrubbing features to mechanically loosen milk residue through a scrubbing action.

5. The device according to claim 1 further comprising a filter unit to segregate the first reservoir from the first one-way valve to prevent residue particles from contaminating and defeating the first one-way valve.

6. The device according to claim 1 wherein the cleaning solution is an enzymatic milk cleanser.

7. A device for cleaning a steam wand of a beverage brewing apparatus, the device comprising:
    a first reservoir adapted to closely encapsulate a steam wand, wherein the first reservoir is open at one end and adapted to receive the steam wand;
    a second elastically deformable reservoir adapted to contain a larger sterile portion of a cleaning solution;
    a scrubbing unit comprises a plurality of scrubbing features to mechanically loosen milk residue through a scrubbing action;
    a first one-way valve operable to connect the second elastically deformable reservoir to the first reservoir; and
    a second one-way valve operable to allow air to flow into the second elastically deformable reservoir.

8. The device according to claim 7, wherein the first reservoir and the second elastically deformable reservoir are made of transparent silicone material to facilitate a user to visually assess a fill level of the small cylindrical reservoir.

9. The device according to claim 7, wherein the first one-way valve and the second one-way valve are duckbilled valves.

10. The device according to claim 7 further comprising a filter unit to segregate the first reservoir from the first one-way valve to prevent residue particles from contaminating and defeating the first one-way valve.

11. The device according to claim 7, wherein the cleaning solution is an enzymatic milk cleanser.

* * * * *